United States Patent [19]

Miller et al.

[11] Patent Number: 4,648,200
[45] Date of Patent: * Mar. 10, 1987

[54] CRUSTACEAN TRAP

[75] Inventors: Daniel R. Miller, Cincinnati, Ohio; Timothy R. Daniels, Marathon, Fla.; Thomas P. Deaton, Mason, Ohio

[73] Assignee: Buckhorn Material Handling Group Inc., Milford, Ohio

[*] Notice: The portion of the term of this patent subsequent to Mar. 10, 2004 has been disclaimed.

[21] Appl. No.: 734,851

[22] Filed: May 16, 1985

Related U.S. Application Data

[63] Continuation-in-part of Ser. No. 642,108, Aug. 20, 1984.

[51] Int. Cl.⁴ .................. A01K 69/08; A01K 69/10
[52] U.S. Cl. .................................. 43/102; 43/105; 43/100
[58] Field of Search .............. 43/100, 102, 103, 105, 43/65; 220/75, DIG. 14, 77

[56] References Cited

U.S. PATENT DOCUMENTS

| | | | |
|---|---|---|---|
| D. 236,466 | 8/1975 | Torngren | D22/18 |
| 475,845 | 5/1892 | Bolling | 43/65 |
| 693,391 | 2/1902 | Holland | 43/100 |
| 744,405 | 11/1903 | Reno | 220/77 |
| 833,737 | 10/1906 | Franklin | 43/105 X |
| 2,530,449 | 11/1950 | Bush | 43/102 |
| 2,536,281 | 1/1951 | Hamel | 43/105 |
| 2,576,524 | 11/1951 | Lewis | 43/100 |
| 2,605,582 | 8/1952 | Allen | 43/100 |
| 3,318,039 | 5/1967 | MacDonald et al. | 43/100 |
| 3,374,770 | 3/1968 | Freudenberger | 119/3 |
| 3,708,905 | 1/1973 | Jalbert | 43/100 |
| 3,821,861 | 7/1974 | Jalbert | 43/100 X |
| 3,906,655 | 9/1975 | Lowenthal, Jr. | 43/100 |
| 3,992,804 | 11/1976 | Senese | 43/100 |
| 4,195,436 | 4/1980 | Moure | 43/100 |
| 4,258,496 | 3/1981 | Leone | 43/102 |

Primary Examiner—Nicholas P. Godici
Assistant Examiner—Carmine Cuda
Attorney, Agent, or Firm—Beall Law Offices

[57] ABSTRACT

The crustacean trap, particularly for a lobster, is molded of separate bottom, opposite side, opposite end and top panels that are thereafter assembled by sliding edge channel joints together for the sides and ends, after which the tops and bottoms are assembled through snap joints. The edge joints are provided with vertically extending channels formed of flanges that permit only vertical assembly or disassembly, and the snap joints for the top and bottom panels are hook-shaped pins received in trapping type apertures to thereafter prevent disassembly of the sides and ends. Crustacean ingress is facilitated and egress inhibited by a funnel formed of molded rigid parallel sides and pivotally adjusted non-parallel sides, with the adjustment being an arcuate array of apertures on the parallel sides to selectively mate with apertures on the non-parallel sides. The parallel sides have cross beams snap assembled to the top and disposed to form a lobster removal opening adjacent the funnel opening.

22 Claims, 16 Drawing Figures

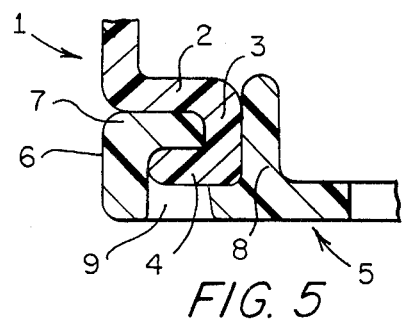
FIG. 5
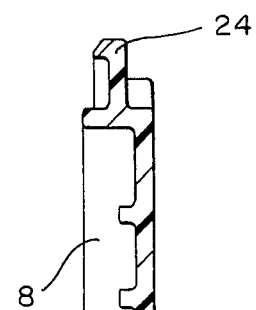
FIG. 6
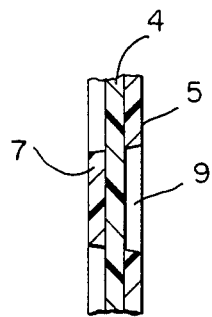
FIG. 7
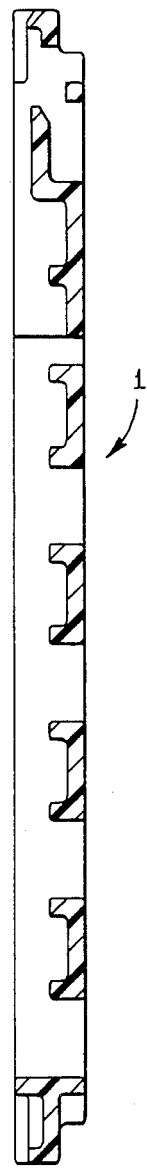
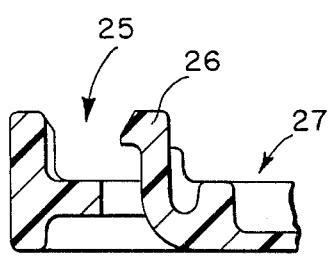
FIG. 9
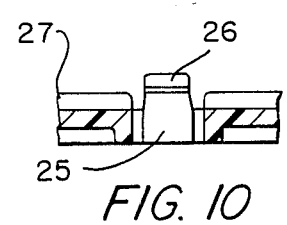
FIG. 10
FIG. 8

CRUSTACEAN TRAP

The present application is a continuation-in-part of "Crustacean Trap", Thomas P. Deaton et al, Ser. No. 642,108, filed Aug. 20, 1984.

BACKGROUND OF THE INVENTION

The present invention relates to crustacean traps, particular lobster traps, that are to be submerged in the sea, baited, and removed periodically to take out lobster that has been trapped by seeking the bait and entering an opening that facilitates their entry, but inhibits their exit.

Traditional wooden traps involve a lot of hand labor in their construction, which is becoming increasingly expensive. The wood takes on water when submerged and therefore the trap becomes quite heavy. The wood is also subject to rapid deterioration.

Plastic material or a synthetic resin material traps have been known, which avoid many of the above problems, in general. While the life of such plastic traps is expected to be greater than that of wood, their initial expense is far greater and may not permit their usage. Therefore, there is a need for a molded plastic crustacean trap that is simple to construct without much labor and inexpensive to mold, while satisfactorily performing the necessary functions of conventional traps.

SUMMARY OF THE INVENTION

It is an object of the present invention to provide a molded plastic crustacean trap that is relatively inexpensive to mold and easily assembled, in addition to satisfactorily performing the conventional functions of such a trap.

More particularly, the trap is molded of separate top, bottom side and end panels, which are thereafter assembled, preferably at the site after shipping, which reduces shipping costs. Assembly is relatively easy by providing vertical sliding assembly of the ends and sides, and thereafter a snap assembly of the top and bottom to hold the sides and ends rigidly in the assembled position. The funnel for facilitating ingress and inhibiting egress of crustaceans is similarly formed of molded synthetic resin or plastic materials of four panels, with two of the panels being stationary parallel side panels having integral cross beams that extend across a central opening in the top and have a snap fit at their opposite ends to the top. The remaining two sides of the funnel are adjustable side panels particularly secured adjacent their mutual top edge to the stationary panels for pivotal movement towards and away from each other, which selected pivotal position is secured by means of an arcuate array of apertures in the stationary funnel sides and apertures in the adjustable funnel sides, for the reception of a locking pin, for example a clip or a screw.

By generally molding only flat planar panels, the molding operation is simplified and therefore cost effective. Also, the flat panels may be shipped in a stacked relationship to provide minimum shipping space, particularly since they are easily assembled on site by untrained people who will actually use the traps. The assembly does not require any tools, since the panels are slid or snapped together, which may be facilitated by hitting them with your hand, a hammer, a brick or any other heavy object. However, it may be desirable to use some tools such as a screwdriver for securing the above-mentioned pin, or securing a wooden escape panel, but such is not necessary. If tools are used they are simple, readily available tools. Construction is simple, rugged and functional.

BRIEF DESCRIPTION OF THE DRAWINGS

Further objects, features and advantages of the present invention will become more clear from the following detailed description of a preferred embodiment, shown in the accompanying drawings, wherein:

FIG. 5 is a cross-sectional view taken along line V—V of FIGS. 3 and 4 showing a coupling in detail for the side and end panels;

FIG. 6 is a cross-sectional view taken along line VI—VI of FIG. 3, of only the end panel;

FIG. 7 is a cross-sectional view taken along line VII—VII of FIG. 3, showing the assembled joint of FIG. 5;

FIG. 8 is a cross-sectional view taken along line VIII—VIII of FIG. 4, showing only the side panel;

FIG. 9 is a cross-sectional view taken along line IX—IX in FIG. 2;

FIG. 10 is a cross-sectional view taken along line X—X of FIG. 2;

DETAILED DESCRIPTION OF THE DISCLOSURE

Presently, it is required that crustacean traps employ an escape panel that will disintegrate during a time period that would indicate that the trap has become lost, which would then permit escape of any trapped crustaceans. It is conventional to employ a wooden panel for this purpose. With the present invention, such wooden panels may be secured by any means, such as screws. Further screws or other metal pins may be used to secure the funnel in an adjusted position. Other minor elements may be made of such or similar materials if desired. Otherwise, the trap of the present invention is molded of a plastic material, for example high density polyethylene foam.

Figure 1:
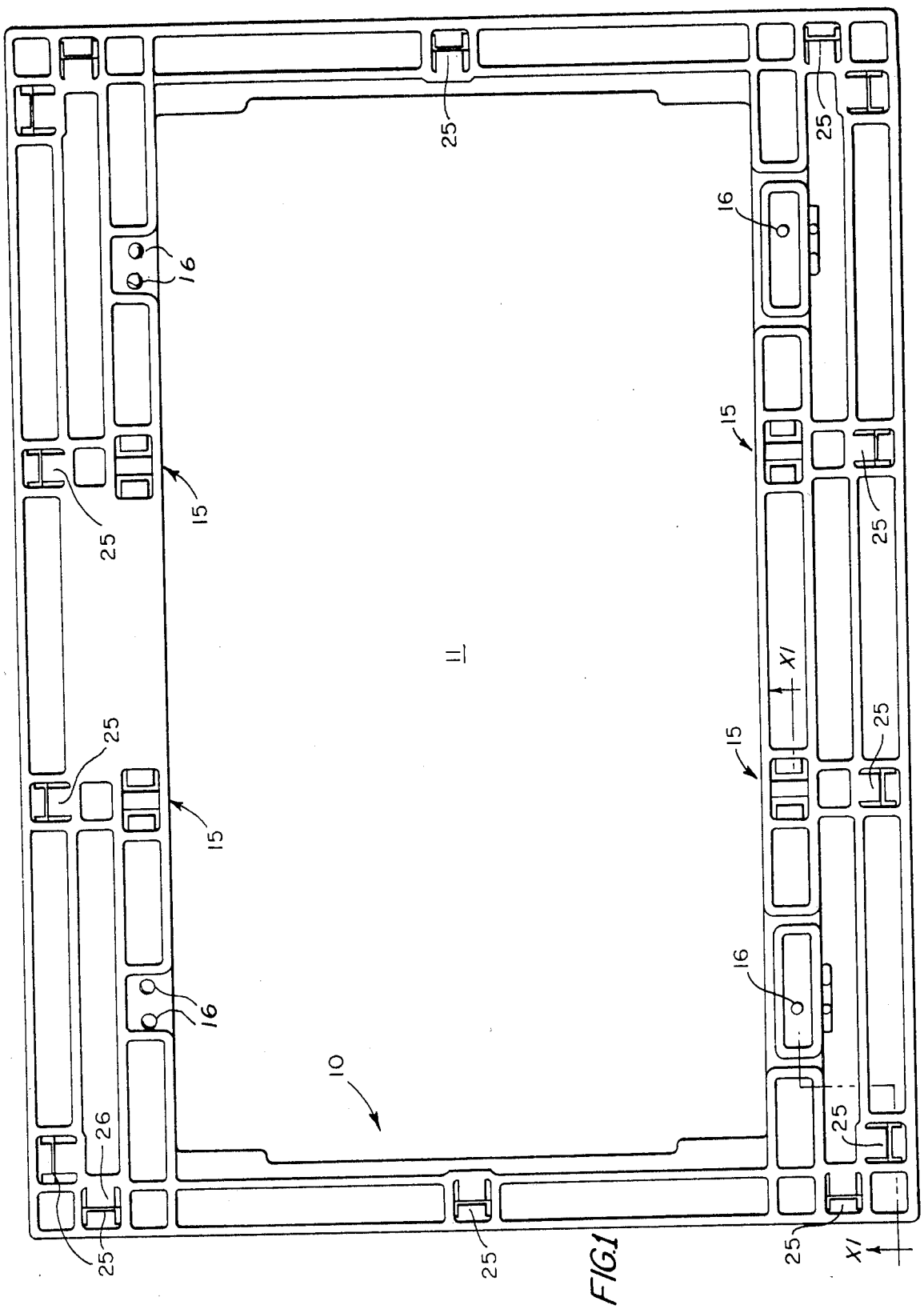
FIG. 1 is a top plan view of the top panel of the crustacean trap according to the present invention.
Figure 2:
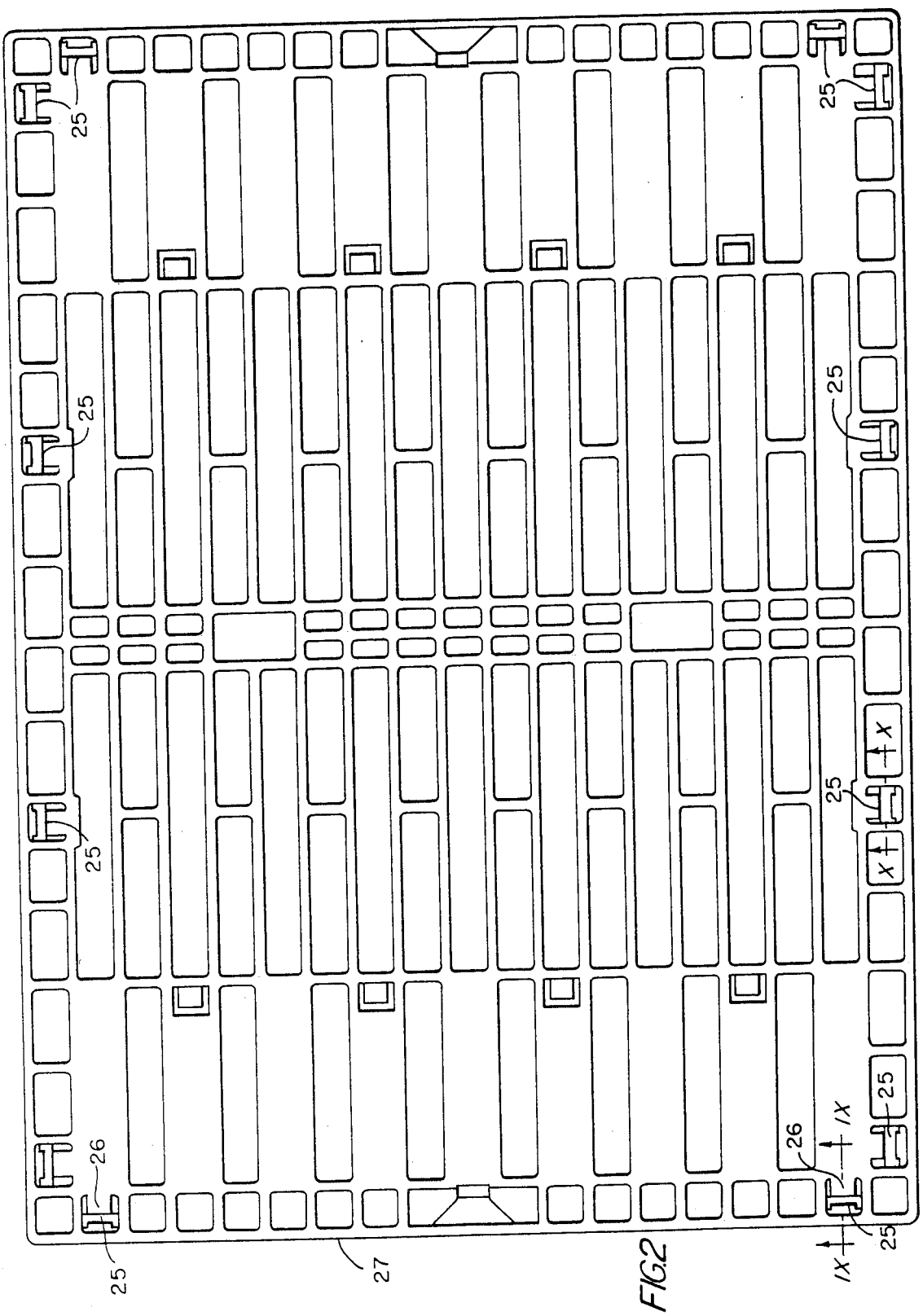
FIG. 2 is a bottom plan view of the bottom panel thereof.
Figure 3:
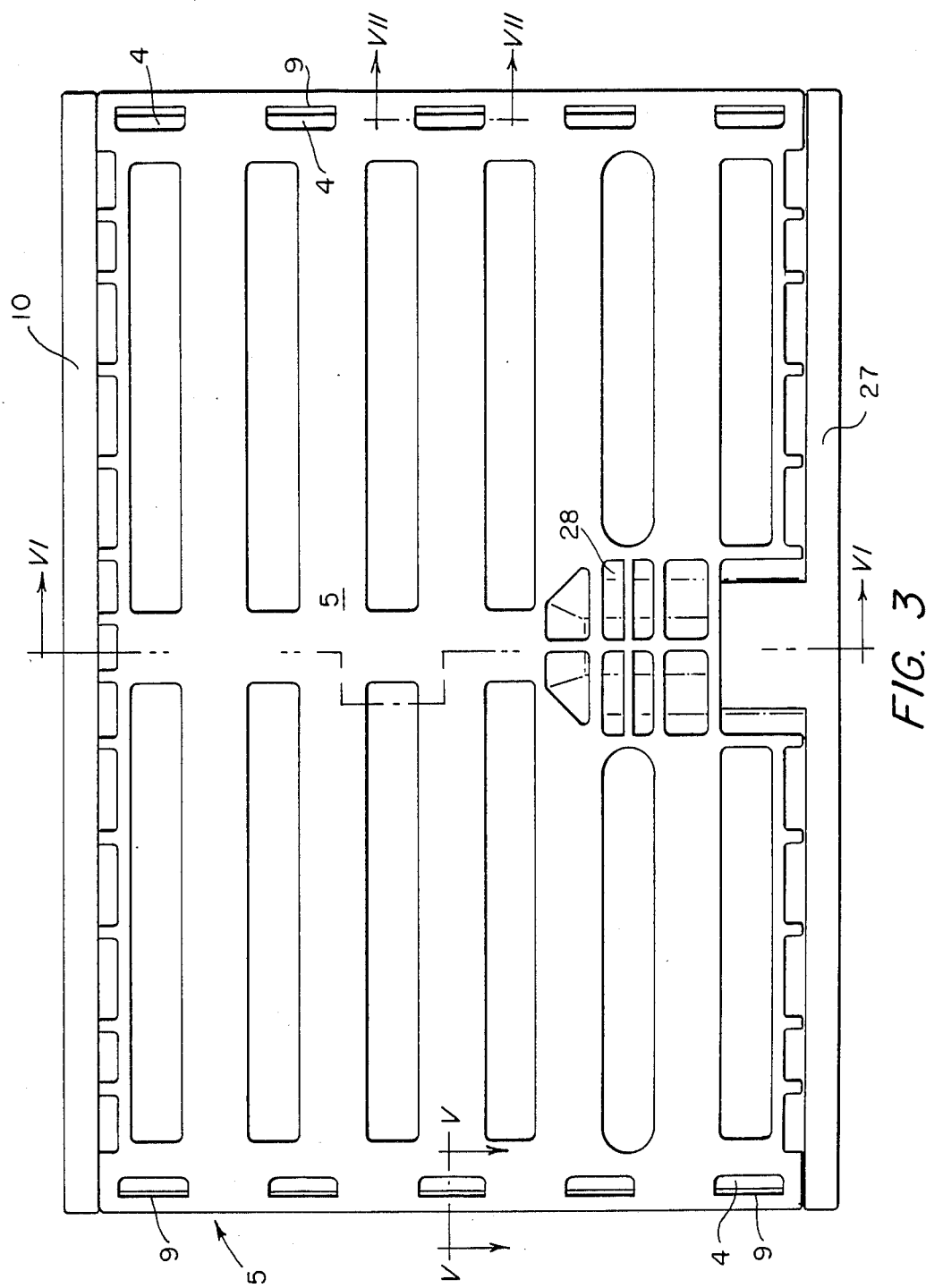
FIG. 3 is an end view of the assembled trap, particularly showing the end panel.
Figure 4:
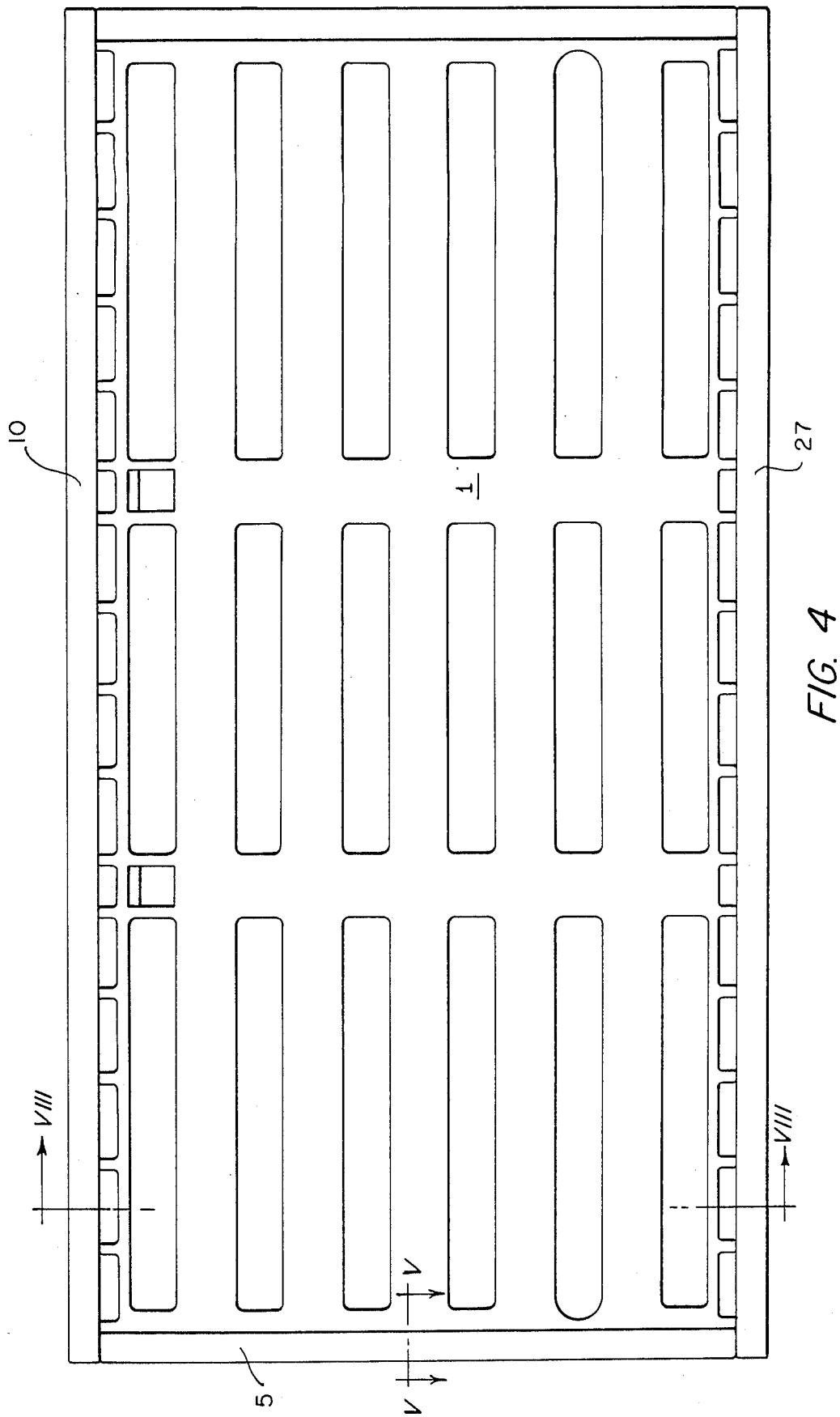
FIG. 4 is a side elevational view of the assembled trap.
Figure 11:
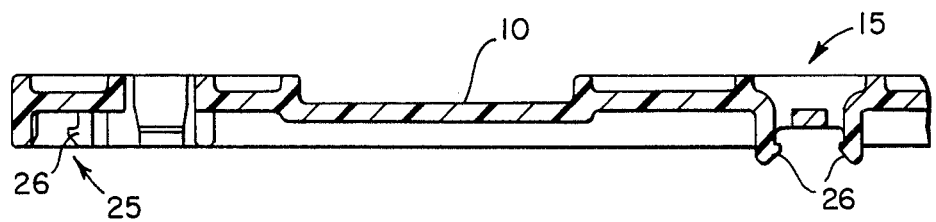
FIG. 11 is a cross-sectional view taken along line XI—XI of FIG. 1, showing the top only.

A basic box structure, is constructed of a top panel shown in FIG. 1, two side panels that are preferably identical and shown in FIG. 4, two end panels that are preferably identical (only one of which may have a bait box if desired) and shown in FIG. 3, and a bottom panel shown in FIG. 2. All of the panels are preferably rectangular in shape.

Each side panel is provided at each of its opposed vertical edges with preferably identical coupling structure formed as a channel. As shown in FIG. 5, the channel is constructed of hook-shaped flanges, more particularly an inwardly extending flange 2, a flange 3 extending parallel to the main extent of the side panel 1, and a return flange 4. Each end panel is provided at each of its opposed vertical edges with complementary shaped channels. As shown in FIG. 5, the end panel 5 employs hook-shaped flanges comprising an inwardly extending flange 6 and a flange 7 extending along parallel to the main portion of the end panel 5. As seen, the hook-shaped flanges or channels interlock. There is a flange in addition to said flanges, more particularly an abutment flange 8 that extends vertically to a sufficient extent to abut the hook-shaped flange of the adjacent panel and to prevent horizontal disassembly or assembly of the channel. As shown, the additional flange is on the end panel 5 by way of example. Preferably, the flange 7 is molded through a mold relief aperture 9, which then requires no movable parts for the mold and no additional mold parts. The flanges for the panel 1 may be similarly molded to simplify molding procedures, as is conventionally known in general. With the above channel construction, the sides and ends of the box may be formed by vertical relative sliding movement between the end and side panels to assemble their channels or hook-shaped flanges.

Figure 14:
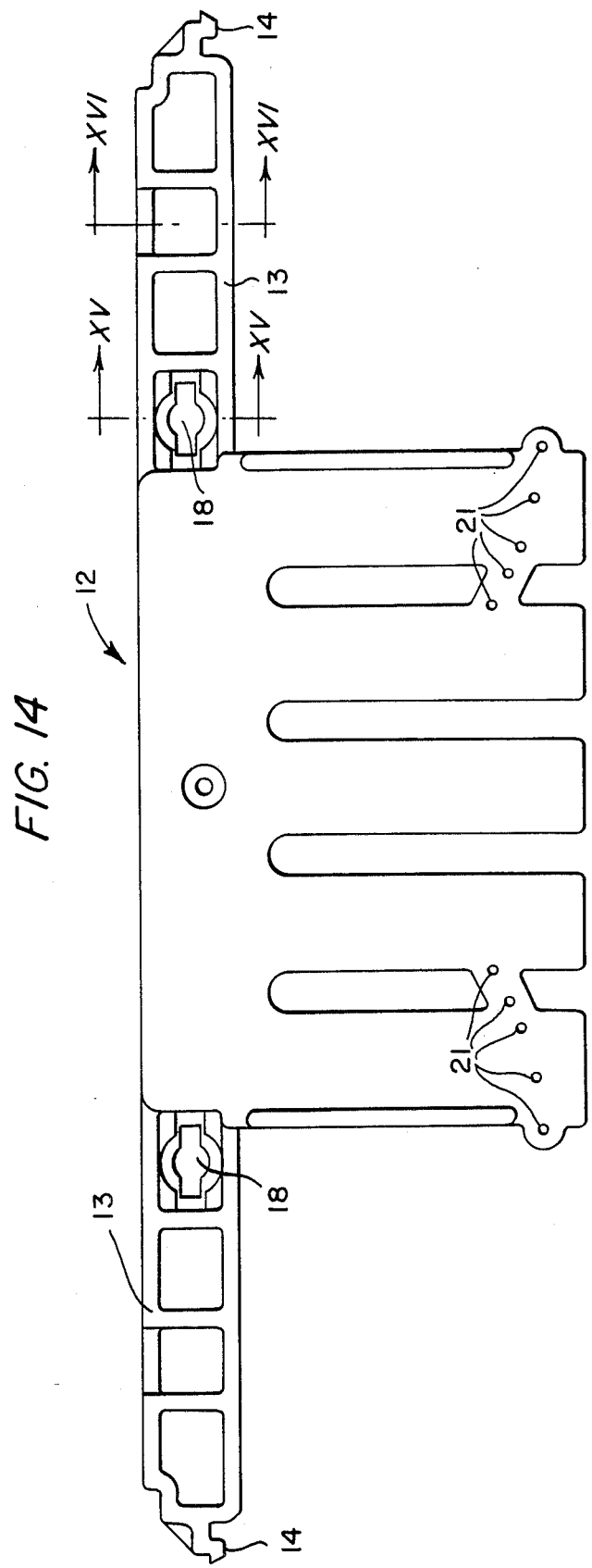
FIG. 14 is an end elevational view of the stationary funnel side.

Preferably, the safety or escape panel, crustacean removal opening, and ingress funnal are provided in the top. For this purpose, the top panel 10 is rectangular in shape and provided with a large central rectangular opening 11 that is at least sufficiently large to permit crustaceans to freely pass into the interior of the box. Two rigid funnel sides 12, which are identical and one of which is shown in FIG. 14, are provided with an integral top beam 13. At opposite ends of the beam 13, there are provided downwardly extending hook-shaped pins 14 that may be forced into complementarily shaped opposed sockets 15 of the top as shown in FIG. 1, so that the pins and sockets are snap-assembled to rigidly and stationarily hold the funnel sides 12 parallel to each other and extending downwardly into the interior of the box. The stationary funnel sides 12 are generally planar, in the plane of FIG. 14, which plane is, in the assembled position, generally parallel to the end panels 5. In such a position, the stationary funnel sides effectively divide the opening 11 in to three openings, with the center opening being the funnel opening and the two outside openings being respectively the opening for removing crustaceans from the trap and the escape opening. The escape opening may be closed with a simple sheet of wood (not shown) and for this purpose holes 16 may be drilled or molded for receiving screws. The opening for removal of crustaceans may be temporarily closed by means of a hinged door (not shown), which may be similarly molded of plastic, constructed of wood and hinged to the top, or constructed of wire, or any other material, and again an aperture or hole 16 is provided for receiving a screw to secure such door. The door and escape panel may be of conventional construction; they have not been shown. Also, the construction of the pin and socket type snap assembly joints will not be discussed in detail since they are easily viewed in the drawings and per se of conventional construction.

Figure 12:
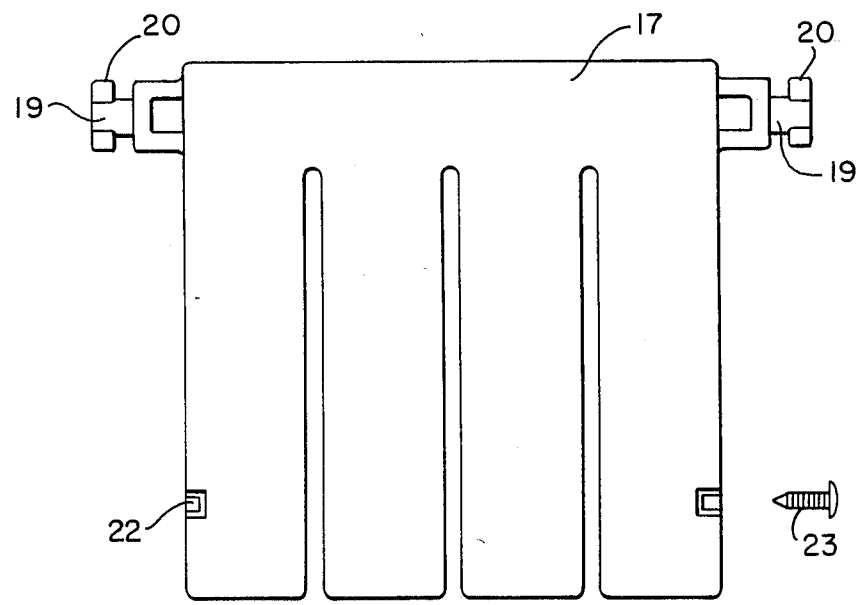
FIG. 12 is a side elevational view of the adjustable funnel side.
Figure 13:
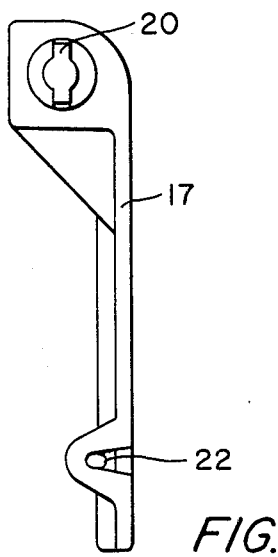
FIG. 13 is an end elevational view of the adjustable funnel side of FIG. 12.
Figure 15:
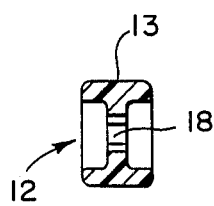
FIG. 15 is a cross-sectional view taken along line XV—XV of FIG. 14.
Figure 16:
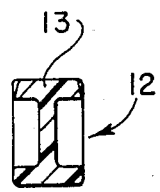
FIG. 16 is a cross-sectional view taken along line XVI—XVI of FIG. 14.

Two opposed generally parallel molded adjustable funnel sides 17 are preferably of identical construction, with one being shown in FIGS. 12 and 13. Each of the stationary funnel sides 12 is provided with two keyhole shaped apertures 18. Each of the adjustable funnel sides has opposed outwardly extending stub shafts 19 with a key 20 on its outer end complementary to the keyhole shaped aperture 18. In assembly, the stub shafts 19 and their adjustable funnel sides 17 are rotated to align the key 20 with the complementary shaped keyhole aperture 18 of the adjacent stationary funnel sides and then the funnel sides are axially moved together to assemble the stub shafts within the keyhole shaped apertures, which assembly position is preferably with the extent of the adjustable funnel sides being horizontal, that is rotationally removed from the normal position of the funnel sides to be discussed below. After the key 20 passes through the keyhole shaped aperture completely, the adjustable funnel sides are rotated downwardly. Thereafter, the assembled funnel sides 12, 17 are inserted as a unit into the opening 11 and the pins 14 of the cross-beams 13 are snap assembled into the sockets 15 of the top panel 10. In this manner, the adjustable funnel sides 17 are pivotally connected adjacent the top panel about parallel axes that are perpendicular to the stationary funnel sides 12. The adjustable funnel sides extend between and generally perpendicular to the stationary funnel sides so that the lower ends of the funnel sides are adjacent to each other within the box. Thereby, the adjustable funnel sides may be pivoted towards and away from each other to form an adjustable size funnel for guiding the ingress of crustaceans and inhibiting the egress of crustaceans. A plurality of through apertures 21 are provided in at least one of the stationary funnel sides and preferably both of them in an arcuate array concentric with respect to the pivot axis of the adjacent keyhole shaped aperture 18. Each adjustable funnel side 17 has an aperture 22 on its opposed vertical edges spaced from the pivot axis the same distance as the corresponding arcuate array of apertures in the adjacent stationary funnel side for a selective register with the apertures in the adjacent array. A pin, for example a screw 23 is selectively inserted between aligned apertures in 21, 22 in the stationary funnel side and adjustable funnel side for securing the adjusted position of the funnel.

The top panel and bottom pannel are similarly secured to the side and end panels. Each of the side, end, bottom and top panels have complementary pins and sockets that are in complementary pairs between the bottom edge of the top panel and the top periphery of the assembled side and end panels, and between the top edge of the bottom panel and the bottom periphery of the assembled side and end panels. Such pins and sockets 24, 25 respectively are similar or identical to the pins 14 and sockets 15 previously described. They may also be of equivalent conventional structure. In this manner, the top panel and the bottom panel are securely attached and assembled to the side and end panels. This will also prevent subsequent relative vertical motion between the side and end panels to thereby prevent disassembly of the interlocking channels of the side and end panels. The sockets effectively form vertically extending connection apertures, extending downwardly for the top panel and upwardly for the bottom panel. These connection apertures preferably have at least one cantilevered tab 26 extending into the connection aperture. Details of this construction are shown in cross-section with respect to the bottom panel 27.

Molded into the end panel 5, or at least one end panel, may be a post 28 to receive a line for retrieving the box. A standard crab pot bail box (not shown) can be mechanically fastened to the side of the stationary funnel.

Instead of a screw 23, a stainless steel wire may be inserted and bent to retain it during assembly of the box to eliminate the use of tools and simplify the structure.

The various panels are preferably made with a plurality of openings, to facilitate the passage of water through the trap, but not sufficiently large to permit escape of crustaceans. Ribbing and buttresses may be provided as is known in plastic molding for strengthening purposes.

The operation, advantages and functions of the preferred embodiment have been set forth along with illustrated variations. Further embodiments, modifications and variations are contemplated in addition to the advantageous details, all in accordance with the spirit and scope of the following claims.

We claim:

1. A lobster trap, comprising:

a molded bottom rectangular panel, two molded side rectangular panels, two molded end rectangular panels, and a molded top rectangular panel serially connected together to form a rectangular box;

said top panel having a large rectangular inlet opening sufficient to permit crustaceans to freely pass into the interior of the box;

two rigid molded stationary funnel sides of generally planar configuration extending downwardly from said top panel on opposed sides of said inlet opening for a substantial distance into the interior of said box, and said stationary funnel sides being generally vertical and parallel to each other;

two opposed generally planar molded adjustable funnel sides pivotally connected adjacent the top panel about parallel axes that are perpendicular to said stationary funnel sides with said adjustable funnel sides being between said stationary funnel sides so that their lower ends are in the vicinity of the lower ends of the stationary funnel sides, and so that the adjustable funnel sides pivot towards and away from each other to form an adjustable size funnel for guiding the ingress of crustaceans and inhibiting the egress of crustaceans;

a plurality of through apertures in at least one of said stationary funnel sides in an arcuate array concentric with respect to the pivot axis of each adjustable funnel side, respectively, each adjustable funnel side having an aperture spaced from its pivot axis the same distance as the corresponding arcuate array of apertures in the adjacent stationary funnel side for a selective register with the apertures in the adjacent array;

pin means for insertion between aligned apertures in said stationary funnel side and adjustable funnel sides for securing an adjusted position of said funnel;

each of said stationary funnel sides including a top beam extending across said opening and being secured to opposite sides of said top panel to form an opening therebetween for the funnel and at least one additional opening between one of said beams and the adjacent opening end of said top panel, which additional opening is sufficiently large to manually remove crustaceans from said trap; and a cover removably mounted to close said additional opening.

2. A lobster trap according to claim 1, wherein each of said stationary funnel sides having two keyhole shaped through apertures; each of said adjustable funnel sides having opposed outwardly extending stub shafts with a key on its outer end complementary to said keyhole shaped aperture for insertion through said keyhole shaped aperture only in a position rotationally removed from the range of positions corresponding to said arcuate array of apertures, so that upon further axial insertion the key will pass completely through the keyhole shaped slot to permit the remainder of the stub shaft to freely rotate within the keyhole shaped slot for forming the pivotal connection between said adjustable funnel sides and said stationary funnel sides.

3. A lobster trap according to claim 2, wherein said stationary funnel sides being releasably secured to said top so that said stub shafts may be completely inserted within said keyhole shaped apertures prior to complete assembly of said stationary funnel sides on said top.

4. A lobster trap according to claim 3, including means forming the releasably secured connection between said stationary funnel sides and said top comprising four downwardly extending apertures in said top, each connection aperture having at least one cantilevered tab extending into the connection aperture, and each of said stationary funnel sides having at its opposite ends downwardly extending hook-shaped pins of a configuration and spacing to be forceably inserted in respective top connection apertures so that said hooks extend under said tabs with a snap action coupling.

5. A lobster trap according to claim 4, wherein opposite vertically extending edges of each of said side and end panels have complimentary vertically extending channels that are assembled through relative vertical sliding motion between adjacent side and end panels.

6. A lobster trap according to claim 5, wherein said channels are formed by hooked shaped flanges that extend only inwardly of the box.

7. A lobster trap according to claim 6 including a flange in addition to said hook shaped flanges extending generally parallel to said hook shaped flanges for at least one of each assembled pair of said sides and end panel channels to engage behind the hook shaped flange of the other to prevent horizontal diassembly of said channels.

8. A lobster trap according to claim 7, wherein each of said side, end, bottom and top panels having complimentary pins and sockets that are in complimentary pairs between the bottom edge of the top panel and the top periphery of the assembled side and end panels, and between the top edge of the bottom panel and the bottom periphery of the assembled side and end panels, said pin and sockets having means forming a snap assembly for securing respectively the top panel and bottom panel to the assembled side and end panels and further for thereafter preventing relative vertical motion between the side and end panels to thereby prevent disassembly vertically of said channels.

9. A lobster trap comprising:

a molded bottom rectangular panel, two molded side rectangular panels, two molded end rectangular panels, and a molded top rectangular panel serially connected together to form a rectangular box;

said top panel having a large rectangular inlet opening sufficient to permit crustaceans to freely pass into the interior of the box;

two rigid molded stationary funnel sides of generally planar configuration extending downwardly from said top panel on opposed sides of said inlet opening for a substantial distance into the interior of said box, and said stationary funnel sides being generally vertical and parallel to each other;

two opposed generally planar molded adjustable funnel sides pivotally connected adjacent the top panel about parallel axes that are perpendicular to said stationary funnel sides with said adjustable funnel sides being between said stationary funnel sides so that their lower ends are in the vicinity of the lower ends of the stationary funnel sides, and so that the adjustable funnel sides pivot towards and away from each other to form an adjustable size funnel for guiding the ingress of crustaceans and inhibiting the egress of crustaceans;

a plurality of through apertures in at least one of said stationary funnel sides in an arcuate array concentric with respect to the pivot axis of each adjustable funnel side, respectively, each adjustable funnel side having an aperture spaced from its pivot axis the same distance as the corresponding arcuate array of apertures in the adjacent stationary funnel side for a selective register with the apertures in the adjacent array;

pin means for selective insertion between aligned apertures in said stationary funnel side and adjustable funnel sides for securing an adjusted position of said funnel;

opposite vertically extending edges of each of said side and end panels have complimentary vertically extending channels that are assembled through relative vertical sliding motion between adjacent side and end panels; and said channels are formed by hook shaped flanges that extend only inwardly of the box.

10. A lobster trap according to claim 9 including a flange in addition to said hook shaped flanges extending generally parallel to said hook shaped flanges for at least one of each assembled pair of said sides and end panel channels to engage behind the hook shaped flange of the other to prevent horizontal disassembly of said channels.

11. A lobster trap according to claim 10, wherein each of said side, end, bottom and top panels having complimentary pins and sockets that are in complimentary pairs between the bottom edge of the top panel and the top periphery of the assembled side and end panels, and between the top edge of the bottom panel and the bottom periphery of the assembled side and end panels, said pin and sockets having means forming a snap assembly for securing respectively the top panel and bottom panel to the assembled side and end panels and further for thereafter preventing relative vertical motion between the side and end panels to thereby prevent disassembly vertically of said channels.

12. A lobster trap according to claim 9, wherein each of said stationary funnel sides including a top beam extending across said opening and being secured to opposite sides of said top panel to form an opening therebetween for the funnel and at least one additional opening between one of said beams and the adjacent opening end of said top panel, which additional opening is sufficiently large to manually remove crustaceans from said trap; and a cover removably mounted to close said additional opening.

13. A lobster trap according to claim 9, wherein each of said side, end, bottom and top panels having complimentary pins and sockets that are in complimentary pairs between the bottom edge of the top panel and the top periphery of the assembled side and end panels, and between the top edge of the bottom panel and the bottom periphery of the assembled side and end panels, said pin and sockets having means forming a snap assembly for securing respectively the top panel and bottom panel to the assembled side and end panels and further for thereafter preventing relative vertical motion between the side and end panels to thereby prevent disassembly vertically of said channels.

14. A lobster trap comprising:
a molded bottom rectangular panel, two molded side rectangular panels, two molded end rectangular panels, and a molded top rectangular panel serially connected together to form a rectangular box;

said top panel having a large rectangular inlet opening sufficient to permit crustaceans to freely pass into the interior of the box;

a funnel for guiding the ingress of crustaceans and inhibiting the egress of crustaceans;

opposite vertically extending edges of each of said side and end panels having complimentary vertically extending channels that are assembled through relative vertical sliding motion between adjacent side and end panels; and said channels are formed by hook shaped flanges that extend only inwardly of the box.

15. A lobster trap according to claim 14, wherein each of said side, end, bottom and top panels having complimentary pins and sockets that are in complimentary pairs between the bottom edge of the top panel and the top periphery of the assembled side and end panels, and between the top edge of the bottom panel and the bottom periphery of the assembled side and end panels, said pin and sockets having means forming a snap assembly for securing respectively the top panel and bottom panel to the assembled side and end panels and further for thereafter preventing relative vertical motion between the side and end panels to thereby prevent disassembly vertically of said channels.

16. A lobster trap according to claim 14 including a flange in addition to said hook shaped flanges extending generally parallel to said hook shaped flanges for at least one of each assembled pair of said sides and end panel channels to engage behind the hook shaped flange of the other to prevent horizontal disassembly of said channels.

17. A lobster trap according to claim 16, wherein each of said side, end, bottom and top panels having complimentary pins and sockets that are in complimentary pairs between the bottom edge of the top panel and the top periphery of the assembled side and end panels, and between the top edge of the bottom panel and the bottom periphery of the assembled side and end panels, said pin and sockets having means forming a snap assembly for securing respectively the top panel and bottom panel to the assembled side and end panels and further for thereafter preventing relative vertical motion between the side and end panels to thereby prevent disassembly vertically of said channels.

18. A lobster trap, comprising:
a molded bottom rectangular panel, two molded side rectangular panels, two molded end rectangular panels, and a molded top rectangular panel serially connected together to form a rectangular box;

said top panel having a large rectangular inlet opening sufficient to permit crustaceans to freely pass into the interior of the box;

two rigid molded stationary funnel sides of generally planar configuration extending downwardly from said top panel on opposed sides of said inlet opening for a substantial distance into the interior of said box, and said stationary funnel sides being generally vertical and parallel to each other;

two opposed generally planar molded adjustable funnel sides pivotally connected adjacent the top panel about parallel axes that are perpendicular to said stationary funnel sides with said adjustable funnel sides being between said stationary funnel sides so that their lower ends are in the vicinity of the lower ends of the stationary funnel sides, and so that the adjustable funnel sides pivot towards and away from each other to form an adjustable size funnel for guiding the ingress of crustaceans and inhibiting the egress of crustaceans;

a plurality of through apertures in at least one of said stationary funnel sides in an arcuate array concentric with respect to the pivot axis of each adjustable funnel side, respectively, each adjustable funnel side having an aperture spaced from its pivot axis the same distance as the corresponding arcuate array of apertures in the adjacent stationary funnel side for a selective register with the apertures in the adjacent array;

pin means for insertion between aligned apertures in said stationary funnel side and adjustable funnel sides for securing an adjusted position of said funnel;

each of said stationary funnel sides having two keyhole shaped through apertures; each of said adjustable funnel sides having opposed outwardly extending stub shafts with a key on its outer end complementary to said keyhole shaped aperture for insertion through said keyhole shaped aperture only in a position rotationally removed from the range of positions corresponding to said arcuate array of apertures, so that upon further axial insertion the key will pass completely through the keyhole shaped slot to permit the remainder of the stub shaft to freely rotate within the keyhole shaped slot for forming the pivotal connection between said adjustable funnel sides and said stationary funnel sides.

19. A lobster trap according to claim 18, wherein said stationary funnel sides being releasably secured to said top so that said stub shafts may be completely inserted within said keyhole shaped apertures prior to complete assembly of said stationary funnel sides on said top.

20. A lobster trap accordin to claim 19, including means forming the releasably secured connection between said stationary funnel sides and said top comprising four downwardly extending apertures in said top, each connection aperture having at least one cantilevered tab extending into the connection aperture, and each of said stationary funnel sides having at its opposite ends downwardly extending hook-shaped pins of a configuration and spacing to be forceably inserted in respective top connection apertures so that said hooks extending under said tabs with a snap action coupling.

21. A lobster trap, comprising:
a rectangular box having a molded synthetic resin top panel having a large rectangular inlet opening sufficient to permit crustaceans to freely pass into the interior of the box;

two rigid molded stationary funnel sides of generally planar configuration extending downwardly from said top panel on opposite sides of said inlet opening for a substantial distance into the interior of said box, and said stationary funnel sides being generally vertical and parallel to each other;

at least one generally planar molded adjustable funnel side pivotally connected adjacent the top panel about an axis perpendicular to said stationary funnel sides with said adjustable funnel side being between said stationary funnel side so that the adjustable funnel side pivots to form an adjustable size funnel for guiding the ingress of crustaceans and inhibiting the egress of crustaceans;

a plurality of means on at least one of said stationary funnel sides spaced from said pivot axis for selectively securing said adjustable funnel side at a plurality of fixed positions pivoted about said axis;

each of said stationary funnel sides having a keyhole shaped through aperture; and said adjustable funnel side having opposed outwardly extending stub shafts with a key on its outer end complimentary to said keyhole shaped aperture for insertion through said keyhole shaped aperture only in a position rotationally removed from the range of positions corresponding to said fixed angular positions, so that upon further axial insertion the key will pass completely through the keyhole shaped slot to permit the remainder of the stub shaft to freely rotate within the keyhole shaped slot for forming a pivotal connection between said adjustable funnel side and said stationary funnel sides.

22. A lobster trap, comprising:
a rectangular box having a molded synthetic resin top panel having a large rectangular inlet opening sufficient to permit crustaceans to freely pass into the interior of the box;

two rigid molded stationary funnel sides of generally planar configuration extending downwardly from said top panel on opposite sides of inlet opening for a substantial distance into the interior of said box, and said stationary funnel sides being generally vertical and parallel to each other;

at least one generally planar molded adjustable funnel side pivotally connected adjacent the top panel about an axis perpendicular to said stationary funnel sides with said adjustable funnel side being between said stationary funnel sides so that the adjustable funnel side pivots to form an adjustable size funnel for guiding the ingress of crustaceans and inhibiting the egress of crustaceans;

a plurality of means on at least one of said stationary funnel sides spaced from said pivot axis for selectively securing said adjustable funnel side at a plurality of fixed positions pivoted about said axis;

at least one of said stationary funnel sides including a top beam extending across said opening and being secured to opposite sides of said box to form an opening therebetween for the funnel and at least one additional opening between said beam and the adjacent opening end of said top panel, which additional opening is sufficiently large to manually remove crustaceans from said trap; and a cover removably mounted to close said additional opening.

* * * * *